2,967,188
3,17-BISOXYGENATED 7-ACYLTHIOESTRA-1,3,5(10)-TRIENES

Raymond M. Dodson, Park Ridge, and Robert C. Tweit, Wilmette, Ill., assignors to G. D. Searle & Co., Chicago, Ill., a corporation of Delaware No Drawing. Filed July 27, 1959, Ser. No. 829,541

4 Claims. (Cl. 260—397.4)

The present invention is concerned with novel steroidal thioesters and, more particularly, with 3,17-bisoxygenated 7-acylthioestra-1,3,5(10)-trienes of the structural formula

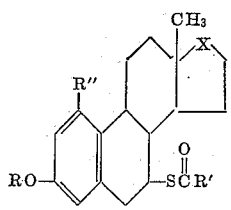

wherein X is selected from the group consisting of carbonyl, β-hydroxymethylene, and β-(lower alkanoyl)oxymethylene radicals, R is selected from the group consisting of hydrogen, lower alkyl, and lower alkanoyl radicals; R' is a lower alkyl radical; and R" is selected from the group consisting of hydrogen and methyl radicals. Lower alkyl radicals which R and R' can represent are exemplified by methyl, ethyl, propyl, butyl, pentyl, hexyl, heptyl, octyl, and the branched-chain isomers thereof. The radicals comprehended by the term "lower alkanoyl" are typified by formyl, acetyl, propionyl, butyryl, valeryl, caproyl, enanthyl, caprylyl, said groups being the acyl radicals of alkanoic acids containing fewer than 9 carbon atoms.

Included also in this invention are novel steroidal tetraenes of the structural formula

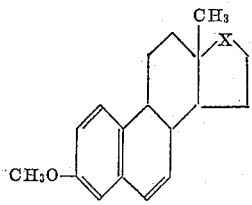

wherein X is selected from the group consisting of carbonyl and β-hydroxymethylene radicals. These tetraenes are useful as intermediates in the preparation of the instant 7-acylthio compounds.

A starting material suitable for the preparation of the instant 1-methyl-7-acylthio compounds is 3-hydroxy-1-methylestra-1,3,5(10),6-tetraen-17-one. This tetraene can be converted, by methods well-known to those persons skilled in the art, to the 3,17-bisoxygenated derivatives of the structural formula

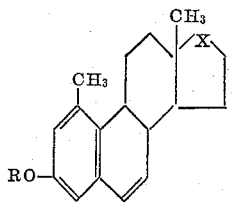

wherein X is selected from the group consisting of carbonyl, β-hydroxymethylene and β-(lower alkanoyl)oxymethylene radicals, and R is selected from the group comprising hydrogen, lower alkyl, and lower alkanoyl radicals.

The 7-acylthio-1-desmethyl compounds of this invention can be prepared from 3-hydroxyestra-1,3,5(10),6-tetraen-17-one. The latter ketone is converted to its 3,17-bisoxygenated derivatives by procedures well-known to those persons skilled in the art.

Reaction of the 3,17-bisoxygenated estra-1,3,5(10),6-tetraenes described supra with a lower thioalkanoic acid under the influence of ultraviolet irradiation results in the 7-acylthio compounds of this invention. As a specific example of the process involved, a mixture of 3-acetoxy-1-methylestra-1,3,5(10),6-tetraen-17-one and thioacetic acid is irradiated with ultraviolet light, resulting in 3-acetoxy-7-acetylthio-1-methylestra-1,3,5(10)-trien-17-one.

The addition of the thioalkanoic acids to the 6,7-double bond of the starting materials employed in the practice of this invention proceeds under steric influences such that of the steroisomers formed, one is obtained in predominant amount. The isomer obtained in predominant amount has in each case been characterized herein as possessing the α-configuration of the 7-acylthio group. This configuration has been designated in order to provide a more complete exposition of the present invention and in order that the specification shall constitute a more useful contribution to the art. However, the designated configuration of the 7-acylthio group is based upon an analysis of molecular rotation data presently appearing in the chemical literature and is therefore not to be interpreted except in relation to the state of the art presently known to organic chemists. It will be apparent that no part of the specification will be materially defective if it should later be established that the configuration is the opposite of that deducible from data presently available to workers in the field.

The 7-acylthio compounds of this invention are useful as a result of their valuable pharmacological properties. They have, for example, the capacity to decrease the serum concentration of cholesterol and the corresponding cholestrol/phospholipid ratio without at the same time producing the potent feminizing side-effects characteristic of known estrogens adapted to regulation of cholesterol metabolism. They have the ability also to potentiate the sedative activity of barbiturates.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight except where otherwise noted.

*Example 1*

To a mixture of 5.75 parts of 3-hydroxyestra-1,3,5(10),6-tetraen-17-one and 100 parts of acetone is added a solution of 2 parts of potassium hydroxide in 2 parts of water. The resulting mixture is heated to 40° with stirring, treated with 3.3 parts of dimethyl sulfate, stirred for one hour longer, then diluted with 100 parts of water. The organic solvent is removed by distillation and the residue extracted with methylene chloride. The organic phase is separated, dried over anhydrous sodium sulfate, and concentrated to dryness at reduced pressure. Recrystallization of the residue from ether yields pure 3-methoxyestra-1,3,5(10),6-tetraen-17-one, M.P. 122–126°.

Substitution of an equivalent quantity of diethyl sulfate in the instant process results in 3-ethoxyestra1,3,5-(10),6-tetraen-17-one, which exhibits infrared maxima at 5.75, 6.25, and 6.70 microns.

Example 2

A mixture of 2 parts of 3-hydroxyestra-1,3,5(10),6-tetraen-17-one, 20 parts of acetic anhydride and 40 parts of pyridine is allowed to stand at room temperature for about 16 hours, then diluted with water. The resulting mixture is extracted with ether and the organic layer separated, washed with water, dried over anhydrous sodium sulfate and evaporated to dryness in vacuo to afford 3-acetoxyestra-1,3,5(10),6-tetraen-17-one.

Substitution of an equivalent quantity of n-butyric anhydride in the instant process results in 3-n-butyroxyestra-1,3,5(10),6-tetraen-17-one.

Example 3

To an ethanol solution of one part of 3-methoxyestra-1,3,5(10),6-tetraen-17-one is added an aqueous ethanol solution of one part of sodium borohydride and the reaction mixture allowed to stand at room temperature for about 18 hours. Water and methylene chloride are then added and the organic layer is separated and concentrated to dryness. The residue is adsorbed on silica gel and the chromatographic column is washed with benzene and eluted with 2% ethyl acetate in benzene. The eluants are concentrated in vacuo to yield 17β-hydroxy-3-methoxyestra-1,3,5(10),6-tetraene, as a glass; $[\alpha]_D = -105°$ (chloroform).

Example 4

A mixture of one part of 17β-hydroxy-3-methoxyestra-1,3,5(10),6-tetraene, 5 parts of acetic anhydride and 10 parts of pyridine is allowed to stand at room temperature for about 18 hours, then concentrated to dryness in vacuo to yield 17β-acetoxy-3-methoxyestra-1,3,5(10),6-tetraene, as a glass.

By substituting an equivalent quantity of propionic anhydride and otherwise proceeding according to the herein described processes, 17β-propionoxy-3-methoxyestra-1,3,5(10),6-tetraene is obtained.

Example 5

A solution of one part of 3-acetoxy-1-methylestra-1,3,5(10),6-tetraen-17-one in 3 parts of thioacetic acid is irradiated with an ultraviolet lamp for 18 hours, then diluted with ether. The ether solution is washed successively with water and aqueous sodium hydroxide, dried over anhydrous sodium sulfate, and concentrated to dryness at reduced pressure. A benzene-pentane solution of the residue is adsorbed on silica gel and the chromatographic column is washed with pentane, then eluted with ether. Concentration of the ether solution affords crystals of 3-acetoxy-7β-acetylthio-1-methylestra-1,3,5(10)-trien-17-one, M.P. 204–205°; $[\alpha]_D = +189°$.

The ether filtrate is combined with the column washings and concentrated to dryness in vacuo. The benzene solution of the residue is adsorbed on silica gel and the column washed successively with benzene and 5% ethyl acetate in benzene then eluted with 10% ethyl acetate in benzene. Concentration of the eluate to dryness in vacuo yields a residue which is crystallized from ether-pentane to afford 3-acetoxy-7α-acetylthio-1-methylestra-1,3,5-(10)-trien-17-one, M.P. 175–176°; $[\alpha]_D = +49°$.

By substituting an equivalent quantity of thio-propionic acid and otherwise proceeding according to the herein described processes, 3-acetoxy-1-methyl-7-propionylthioestra-1,3,5(10)-trien-17-one is obtained.

Example 6

A mixture of 1.06 parts of 3-methoxyestra-1,3,5(10), 6-tetraen-17-one and 3 parts of thioactic acid is irradiated with ultraviolet light for about 16 hours. The reaction mixture is concentrated invacuo and the residue dissolved in ether. The ether solution is washed with aqueous sodium hydroxide and concentrated to dryness in vacuo and this residue is dissolved in benzene. Adsorption of the benzene solution on silica gel followed by washing of the chromatographic column with benzene and elution with 2% ethyl acetate in benzene affords 7-acetylthio-3-methoxyestra - 1,3,5(10)-trien-17-one, obtained as a glass.

Substitution of an equivalent quantity of thioproponic acid in the instant process affords 3-methoxy-7-propionylthioestra-1,3,5(10)-trien-17-one.

Example 7

A mixture of one part of 17β-acetoxy-3-methoxyestra-1,3,5(10),6-tetraene and 3 parts of thioacetic acid is irradiated with an ultraviolet light for about 16 hours, then diluted with benzene. The benzene solution is adsorbed on silica gel and the column washed with benzene and eluted with 2% ethyl acetate in benzene. Concentration of the eluate in vacuo affords 17β-acetoxy-7-acetylthio-3-methoxyestra-1,3,5(10)-triene, as a glass.

By substituting equivalent quanties of 17β-hydroxy-3-methoxyestra - 1,3,5(10),6 - tetraene, 17β-propionoxy-3-methoxyestra-1,3,5(10),6-tetraene, 3-n-butyroxyestra-1,3, 5(10),6 - tetraen - 17 - one, or 3-ethoxyestra-1,3,5(10),6-tetraen-17-one and otherwise proceeding according to the herein described processes; 7-acetylthio-17β-hydroxy-3-methoxyestra - 1,3,5(10) - triene, 7-acetylthio-3-methoxy-17β-propionoxyestra - 1,3,5(10) - triene, 7-acetylthio-3-n-butyroxyestra-1,3,5(10)-trien-17-one, and 7-acetylthio-3-ethoxyestra-1,3,5(10)-trien-17-one are obtained.

What is claimed is:
1. A compound of the structural formula

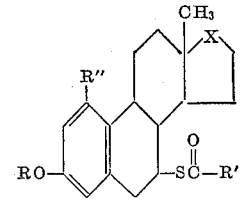

wherein X is selected from the group consisting of carbonyl, β-hydroxymethylene, and β-(lower alkanoyl)oxymethylene radicals; R is selected from the group consisting of lower alkyl and lower alkanoyl radicals; R' is a lower alkyl radical; and R" is selected from the group consisting of hydrogen and methyl radicals.

2. 3 - acetoxy - 7 - acetylthio - 1 - methylestra - 1,3,5-(10)-trien-17-one.

3. 7 - acetylthio - 3 - methoxyestra - 1,3,5(10) - trien-17-one.

4. 17β - acetoxy - 7 - acetylthio - 3 - methoxyestra - 1, 3,5(10)-triene.

References Cited in the file of this patent
UNITED STATES PATENTS

| 2,327,376 | Schwenk | Aug. 24, 1943 |
| 2,671,092 | Djerassi et al. | Mar. 2, 1954 |

OTHER REFERENCES

Iriarte et al.: J. Am. Chem. Soc., vol. 80, pages 6105–10 (1958).